United States Patent [19]

Hirose et al.

[11] Patent Number: 4,858,290
[45] Date of Patent: Aug. 22, 1989

[54] MACHINE TOOL INDEXING APPARATUS

[75] Inventors: Noboru Hirose, Nagoya; Akira Hirose, Konan, both of Japan

[73] Assignee: Brother Kogyo Kabushiki Kaisha, Nagoya, Japan

[21] Appl. No.: 98,222

[22] Filed: Sep. 18, 1987

[30] Foreign Application Priority Data

Oct. 23, 1986 [JP] Japan .............................. 61-252519
Oct. 23, 1986 [JP] Japan ......................... 61-162430[U]

[51] Int. Cl.⁴ ............................................. B23B 29/30
[52] U.S. Cl. ........................................ 29/35.5; 74/820
[58] Field of Search ................. 74/813 R, 816, 820,
74/813 L; 29/40, 48.5 R, 48.5 A, 39, 35.5, 43, 44

[56] References Cited

U.S. PATENT DOCUMENTS

| | | | |
|---|---|---|---|
| 3,403,586 | 10/1968 | Paterson | 74/820 |
| 3,583,258 | 6/1971 | Fouse | 74/820 |
| 3,665,789 | 5/1972 | Fisher | 74/820 X |
| 4,095,489 | 6/1978 | Hasegawa | 74/820 |
| 4,109,552 | 8/1978 | Imoberdorf | 74/813 L |
| 4,302,870 | 12/1981 | Schalles et al. | 29/40 |
| 4,667,531 | 5/1987 | Kato et al. | 74/813 R |

FOREIGN PATENT DOCUMENTS

| | | | |
|---|---|---|---|
| 202608 | 12/1982 | Japan | 29/40 |
| 60-29042 | 3/1985 | Japan . | |
| 61-6023 | 11/1986 | Japan . | |

OTHER PUBLICATIONS

C. Cochran et al, IBM *Technical Disclosure Bulletin*, vol. 10, No. 8, Jan. 1968, p. 1217.

*Primary Examiner*—William Briggs
*Attorney, Agent, or Firm*—Finnegan, Henderson, Farabow, Garrett & Dunner

[57] ABSTRACT

A machine tool having a main spindle head and an indexing table those being inclined with respect to a horizontal plane. The machine tool comprises the main spindle head, a main spindle, a reciprocation drive means and the indexing table. The main spindle is provided with a tool mount portion at one end portion thereof for mounting a tool, and the reciprocation drive means drives the main spindle head in an axial direction of the main spindle. The indexing table mounts thereon a workpiece and is angularly rotatable about its central axis. Further, an indexing apparatus is also disclosed. The apparatus comprises a base frame, an indexing table, an indexing shaft, a single drive source, a drive means, a follower member, coupling means and shifting means. The drive means is connected to the single drive source, and the follower member is connected to the indexing shaft and is engageable with the drive means for rotating the indexing shaft about its axis. The shifting means is operably provided for moving said indexing shaft in axial direction thereof in response to the drive means. The axial movement of the indexing shaft provides engagement and disengagement of the coupling means.

5 Claims, 9 Drawing Sheets

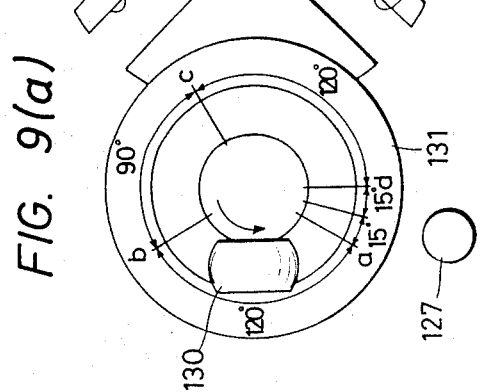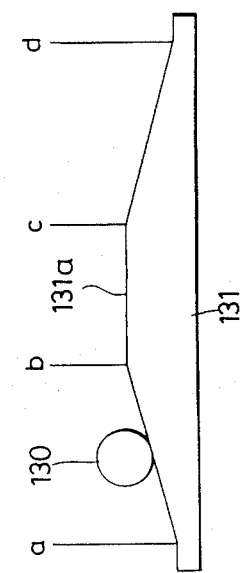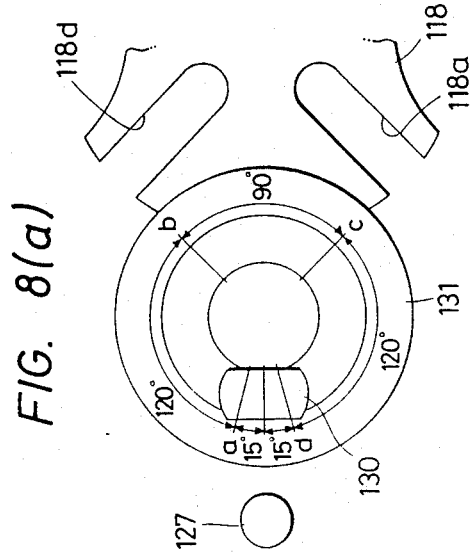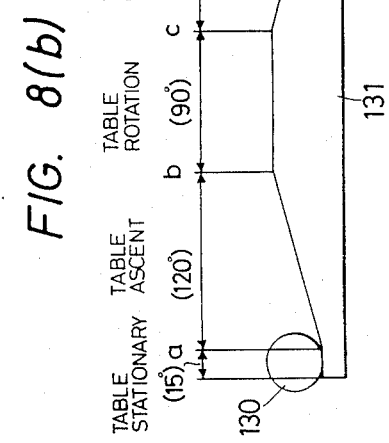

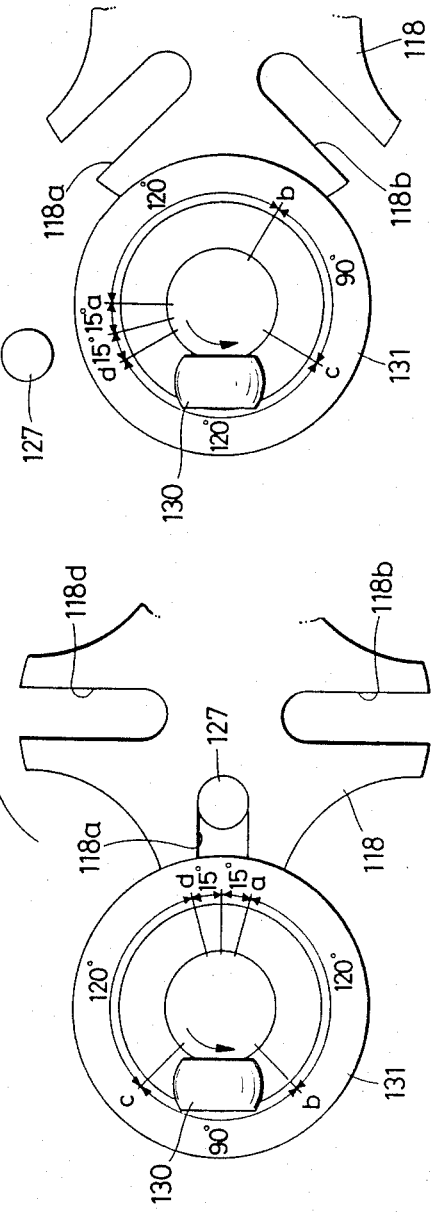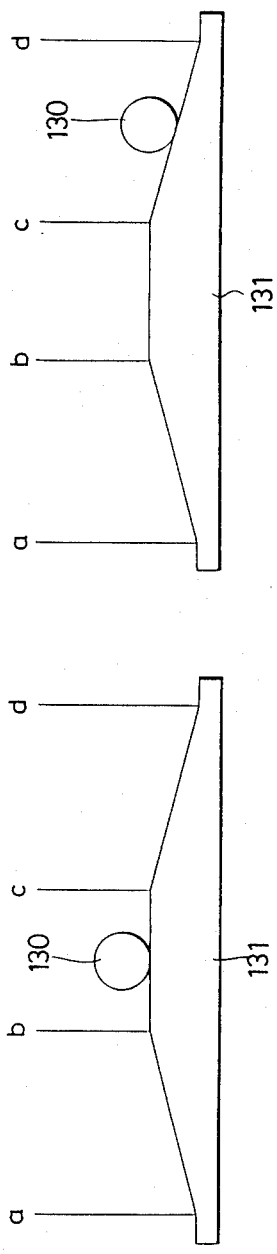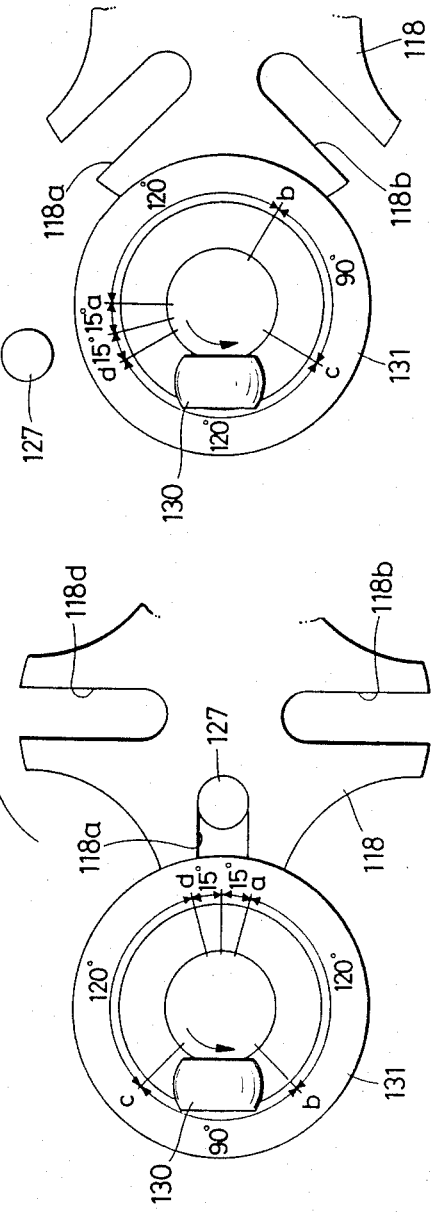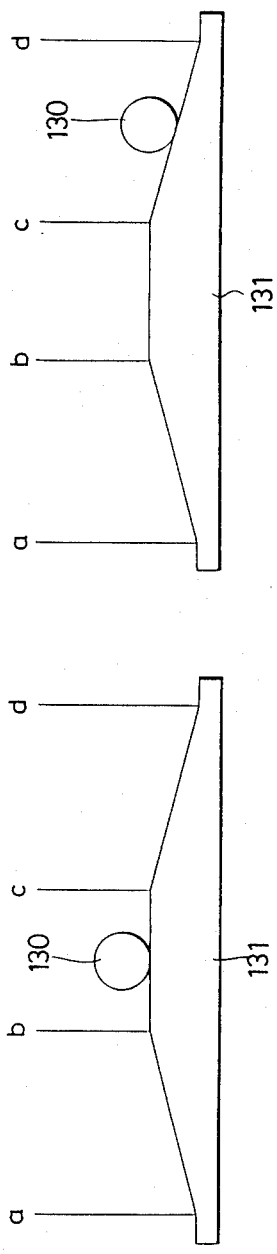

MACHINE TOOL INDEXING APPARATUS

BACKGROUND OF THE INVENTION

The present invention relates to a machine tool, and more particularly to a type thereof wherein a workpiece is easily mounted on an indexing table and the workpiece is easily visible during machining. The present invention also relates to an indexing apparatus wherein locking of an indexing table, unlocking of the table, and rotational indexing thereof can be performed successively by a single drive source, the table mounting thereon a workpiece.

There are various types of machine tools such as a drilling machine which forms bores in a workpiece, a tapping machine which forms internal thread on a previously formed bore, and a machining center (MC) which performs various kinds of cutting in automatically changing and selecting an optimum tool.

These machine tools are divided broadly into two categories in terms of arrangement or orientation of a main spindle which mounts a tool, that is, a vertical axis type as shown in FIG. 12 and a horizontal axis type as shown in FIG. 13. In the vertical axis type shown in FIG. 12, guide rails 12 extend vertically on a vertical guide face 10a of a column 10, and a main spindle head 14 is provided vertically movable along the guide rails 10a. A main spindle 16 is oriented downwardly from the spindle head 14. An indexing table 18 extends in horizontal direction at a position below the guide face 10a, and a workpiece 22 is detachably secured to the table 18 through a jig 20.

In the vertical axis type, a rotational axis c of the indexing table 18 is directed in horizontal direction and perpendicular to the main spindle 16. Therefore, operator must fix the jig 20 and the workpiece 22 to a vertically orienting fixing plane 18a of the indexing table 18, and the operator must replace the jig 20 and/or the workpiece 22 from another one at the vertically extending plane. Such fixing or replacing works would be rather troublesome. Particularly, if the workpiece 22 has heavy weight, the operator must lift the workpiece and abut the same on the vertically extending fixing plane 18a of the indexing table 18, which work requires hard labor.

With respect to the horizontal axis type shown in FIG. 13, guide rails 12 extend in horizontal direction on a horizontal bed 24, and a main spindle head 14 is disposed movable in horizontal direction along the guide rails 12. An indexing table 18 which holds a workpiece 22 is positioned in front of a main spindle 16. That is, if observing from the operator's side, the indexing table 18 is positioned frontward side of the machine tool, and the main spindle head 14 is positioned behind the table 18.

According to the horizontal axis type, the workpiece 22 is subjected to machining at the rear side of the table 18. Therefore, operator who is positioned in front of the machine tool cannot easily observe the machining condition of the workpiece. In order to visually observe the machining condition, the operator must walk around the machine tool, so that additional space is required for observation around the machine tool in addition to the machine installation space. Therefore, bulky space is required. Further, a tool fixed on the main spindle 16 moves in horizontal direction during machining. If hole is formed in the workpiece, the hole also extends horizontally, so that tool lubrication oil cannot be sufficiently reached to the tool blade portion. As a result, tool damage or thermal seizure thereof may occur due to insufficient circulation of the lubrication oil. One example of a conventional machine tool is disclosed in Japanese Utility Model Publication No. 61-6023, in which vertically extending jig mounts thereon a workpiece, and a machine head and a tool is positioned behind the workpiece.

Turning to the indexing apparatus, the machining center (MC) normally includes the index table which fixedly secures a workpiece. The index table serves as the indexing apparatus. The indexing apparatus generally includes a geneva mechanism for intermittent rotation of the table which mounts the workpiece in order to index one of the workpiece planes to be machined relative to the tool.

In the indexing apparatus used in a machine tool such as the machining center, heavy mechanical load is applied to the table and the workpiece mounted on the table during various machining to the workpiece. Therefore, a locking mechanism is provided for fixing the table to a main body of the machine tool so as to prevent the table from its rotation during machining. For example, Japanese Utility Model application Publication (Kokai) No. 60-29042 discloses a mechanism for locking a table 203 to a support base 201 during machining so as to receive heavy load on both the table 203 and the support base 201 as shown in FIG. 14. The locking is released when the rotational indexing is conducted for allowing the table to be rotated. More specifically, in the indexing apparatus shown in FIG. 14, coupling means 204 204 are provided between the table 203 and the support base 201. The coupling means are in selective meshing engagement with each other and the meshing can be disengageable from each other. The coupling is so called Curvic gears(Trade name). The table 203 is vertically movable by means of a power cylinder drive means 205. For the rotational indexing, the table 203 is lifted by the power cylinder 205 to disengage one curvice gear 204 from the other, and then the table 203 is rotated by a drive motor. Upon completion of the indexing, the power cylinder drives the table 203 downwardly to provide meshing engagement between the gears 204 204, so that the table 203 is in locking engagement with the support base 201 for withstanding heavy load by the entire apparatus during machining.

As described above, such conventional indexing apparatus positively locks the table to the main body during machining, and the table is lifted to release the locking for rotational indexing. For this, the conventional device requires additional driving source such as the above-described power cylinder means for vertically moving the table to fix and release the table in addition to the main drive source for rotationally indexing the table.

Such conventional indexing apparatus requires complicated structure and high production cost due to the provision of two drive sources. Further, it takes relatively long time for the rotational indexing and locking unlocking operation due to independent switching operations of the two drive sources.

SUMMARY OF THE INVENTION

It is therefore, an object of the present invention to overcome the above-described prior art drawbacks and disadvantages and to provide an improved machine tool.

Another object of the present invention is to provide such machine tool in which a workpiece and a jig are easily attachable to an indexing table.

Still another object of the invention is to provide the machine tool capable of providing excellent observation to a machined portion of the workpiece even in front of the machine tool.

Still another object of the invention is to provide the machine tool in which lubrication oil or cutting oil can be spread over the entire surface of the tip end portion of the tool.

Still another object of the invention is to provide an improved indexing apparatus capable of performing rotational indexing of the table, table locking and table unlocking by a single drive source.

Still another object of the present invention is to provide such indexing apparatus having simple construction and produced at low cost.

Still another object of the invention is to provide the indexing apparatus capable of performing indexing operation within a minimum period of time.

Briefly, and in accordance with the present invention, the machine tool includes a main spindle, a main spindle head and an indexing table. The central feature resides in the slanting arrangement of the main spindle head and the indexing table with respect to a horizontal plane. The main spindle has one end portion provided with a tool mount portion, and the main spindle head mounts thereon the main spindle, and is movable in axial direction of the main spindle by a reciprocation drive mechanism. The indexing table has a rotation axis oriented in a direction perpendicular to the axis of the main spindle. A workpiece is mounted on the indexing table, and the workpiece is subjected to machining by the tool mounted on the main spindle. Because of the slanting or inclined arrangement of the main spindle head and the index table, visual dead space is eliminated for the workpiece observation during machining, and workability is improved because of the easy installation of the workpiece to the indexing table, which installation work has not been easily carried out in the conventional vertical axis type apparatus.

In an improved indexing apparatus of the present invention, a single rotation drive source drives a drive means, and an indexing shaft is displaced in axial direction in response to shifting means, so that coupling means are engaged with each other for locking an indexing table and are disengaged from each other for allowing the indexing table to be rotated. The indexing apparatus includes the indexing shaft for rotating the indexing table mounting thereon a workpiece about its central axis and for moving the same in axial direction thereof. The indexing shaft is provided with a follower member engageable with the drive means. The drive means is driven by the rotation drive source and engageable with the follower member so that the table is angularly rotated by a predetermined angle for the indexing operation. The coupling means are provided between the table and a base frame. The shifting means is engaged with the drive means as well as the indexing shaft. The shifting means is moved in response to the drive means, so that the indexing shaft is moved in axial direction, to thereby provide selective engagement between the coupling means. The rotation drive source rotates the indexing table about its axis as well as moves the indexing shaft in axial direction thereof through the drive means and the shifting means. Therefore, compact and simple apparatus results with high indexing operation speed.

BRIEF DESCRIPTION OF THE DRAWINGS

In the drawings;

FIGS. 8(a), 9(a), 10(a) and 11(a) are schematic plan views showing gradual changes of positional relationship, with time, among a roller, flat plate cam, follower member and a follower wheel;

FIGS. 8(b), 9(b), 10(b) and 11(b) show exloded views of the flat plate cam and gradual change of the relative position, with time, between the cam and the roller;

DETAILED DESCRIPTION OF THE PREFERRED EMBODIMENTS

One embodiment of a machine tool according to the present invention will be described with reference to FIGS. 1 to 4. The following description is specific to a machining center (MC) wherein tools are automatically exchanged for various kinds of cutting or machining. However, the present invention is also available for a drilling machine and a tapping machine those performing a single kind machining.

Figure 1:
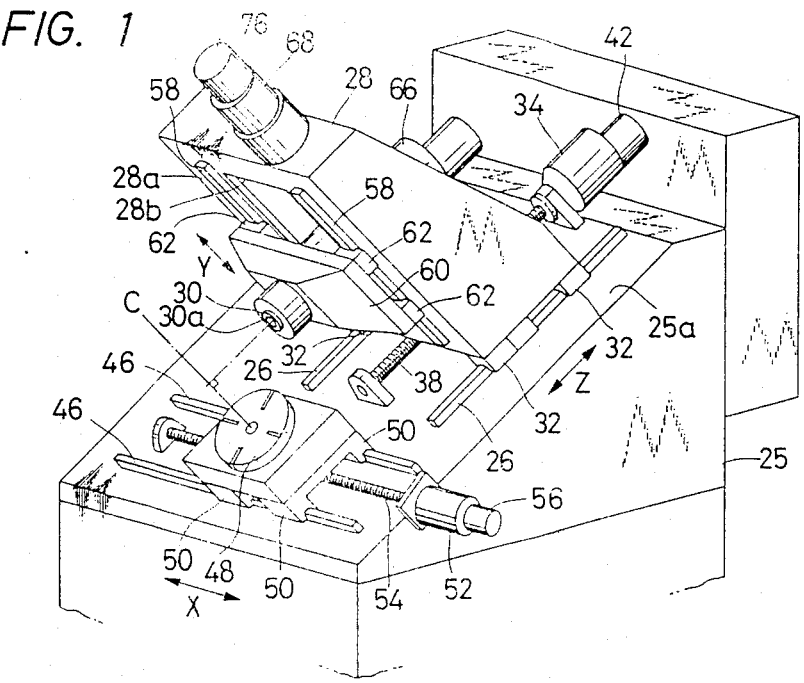
FIG. 1 is a perspective view showing a machine tool according to one embodiment of the present invention.

In FIG. 1, a head mounting face 25a of a base 25 is inclined upwardly with respect to a horizontal plane such as a machine tool installation floor (front-low, rear-high configuration when viewing the machine tool at a position in front of the machine tool). The expression "front" "rear" "above" and "below" are used herein to define the various parts when the machine tool is installed in an orientation in which it is intended to be used. The inclination angle is for example about 50 degrees. A pair of guide rails 26 26 extend on the head mounting face 25a and direct in the inclining direction (Z-direction in FIG. 1) of the face. A main spindle head 28 is slidingly movable on the rails 26.

Figure 3:
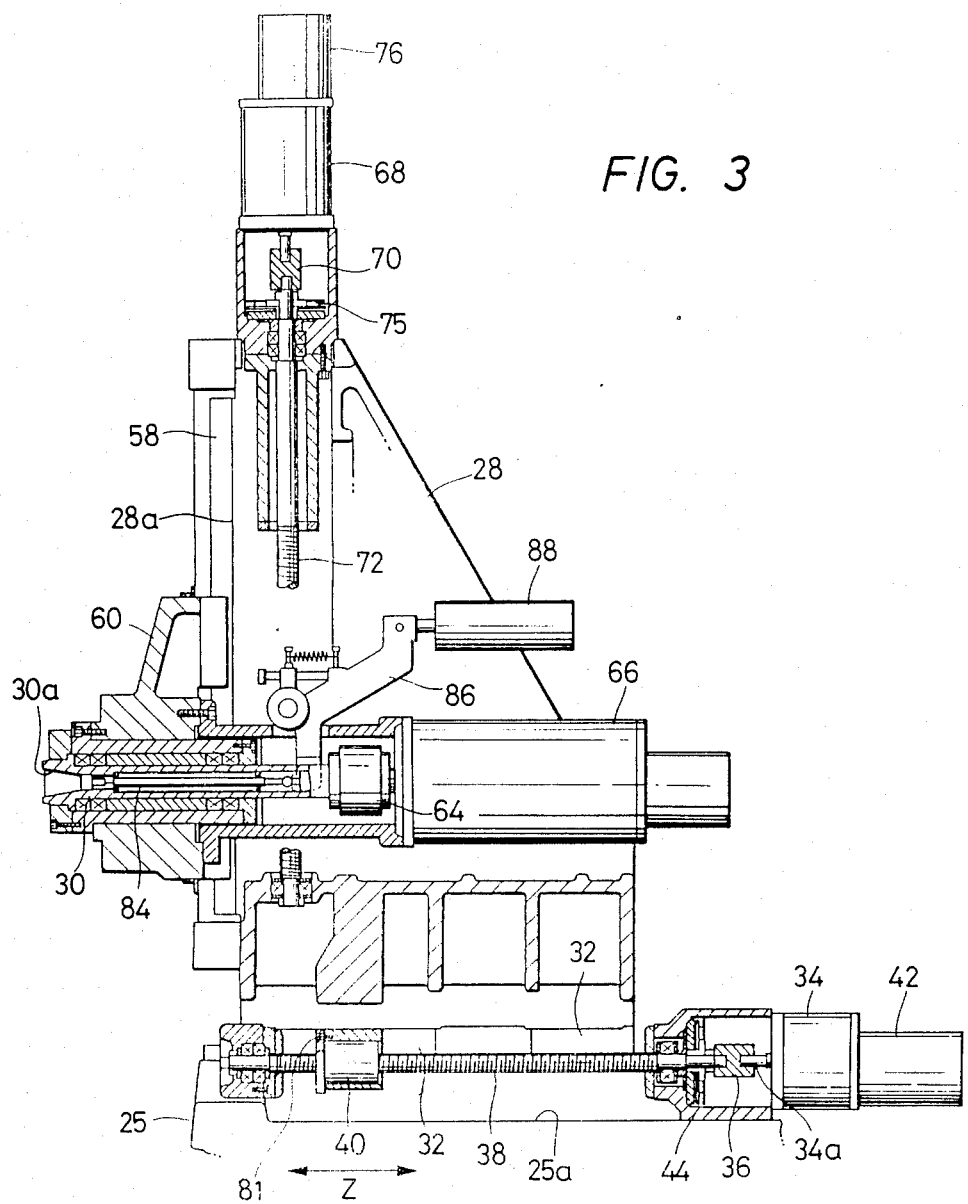
FIG. 3 is a vertical cross-sectional view showing a main spindle head in the machine tool according to the embodiment.

The main spindle head 28 supports a main spindle stand 60 slidably movable along a front face 28a of the head 28. The main spindle stand 60 is provided with a main spindle 30 described later. The main spindle head 28 has a bottom surface provided with slider pieces 32. More specifically, on each of the guide rails 26, a pair of slider pieces 32 are slidably movablly fitted and in close contact with the rails 26, so that the main spindle head 28 is stably supported on the rails 26. An AC servo motor 34 is fixed to the central uppermost portion of the head mounting face 25a. As shown in FIGS. 1 and 3, a ball screw 38 extends in the inclination direction of the face 25a and between the rails 26 and 26. The ball screw 38 has one end connected to a rotation shaft 34a of the AC servo motor 34 through a coupling 36. Further as shown in FIG. 3, a nut 40 is fixed to a bottom portion of the main spindle head 28 by bolts 81, and the nut 40 is in threading engagement with the ball screw 38. Therefore, upon actuation of the AC servo motor 34, the ball screw 38 is rotated about its axis so that the nut 40 together with the main spindle head 28 are moved along the guide rails 26 by a predetermined Z-direction stroke. Incidentally, the AC servo motor 34 is provided with an angular resolver 42 for detecting the angular rotation of the motor shaft 34a. The motor 34 is subjected to closed loop servo control in response to an instruction signal from the resolver 42.

As best shown in FIG. 3, a brake means such as an electromagnetic brake 44 is disposed at the one end of the ball screw 38 at a position adjacent the coupling 36. When the AC servo motor 34 is deenergized, the brake 44 is actuated so as to prevent the main spindle head 28 from its displacement in downward direction due to its own weight.

A second pair of guide rails 46 46 are provided at a lower portion of the mounting face 25a. The second pair of guide rails 46 extend in a direction perpendicular to the first pair of guide rails 26 26 as shown in FIG. 1. On the second guide rails 26, an indexing table 48 is mounted. The indexing table 48 is intermittently rotatable about a rotational indexing axis c in order to render a workpiece mounted on the table to be angularly rotated for the indexing. The rotational indexing axis c extends in a direction perpendicular to the axis of the main spindle 30 mounted on the main spindle head 28. (see one dotted chain lines in FIG. 1)

Second sets of slider pieces 50 is provided at the bottom portion of the indexing table 48. A pair of pieces 50 is slidably fitted with each one of the guide rails 46. Further, a second AC servo motor 52 is fixed to a side surface of the base 25. A second ball screw 54 extends between the rails 46 and has one end connected to a motor shaft (not shown) of the servo motor 52 through a second coupling (not shown). A nut (not shown) is provided at the bottom portion of the table 48. The nut is threadingly engaged with the ball screw 54. By the rotation of the AC servo motor 52, the table 48 moves by a predetermined stroke on the rails 46 in X-direction shown in FIG. 1 because of the threading engagement between the nut and the screw 54. The motor 52 is provided with a resolver 56 for detecting and controlling the angular rotation of the motor shaft.

Figure 2:
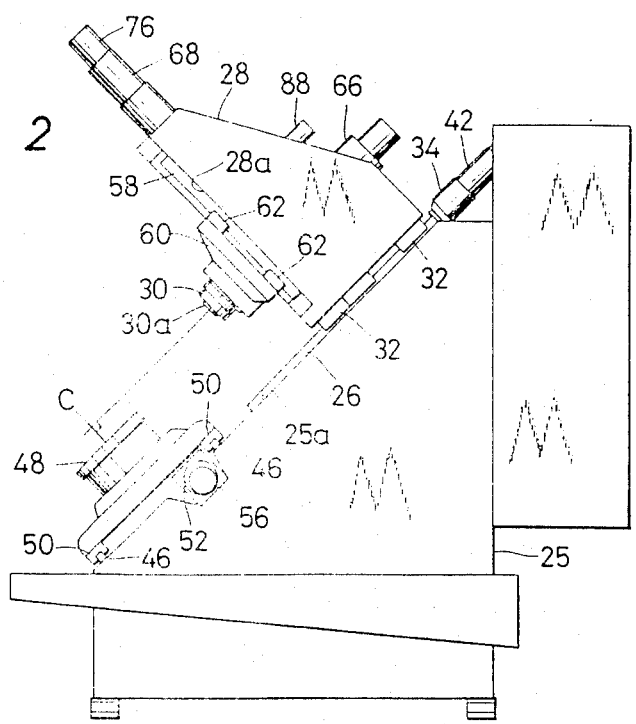
FIG. 2 is a side view of the embodiment.

As shown in FIGS. 1 and 2, a rectangular opening 28b is formed at a front face of the main spindle head 28, and a pair of guide rails 58 58 are arranged on the front face 28a interposing the opening 28b therebetween. The guide rails 58 extend in a direction parallel with the rotation axis c and perpendicular to the guide rails 26 which allows the head 28 to move in Z-direction. That is, the guide rails 58 extend in Y-direction as shown in FIG. 1, (upstanding direction of the spindle head 28). The main spindle stand 60 is slidably moved in the Y-direction through a plurality of slider pieces 62.

Figure 4:
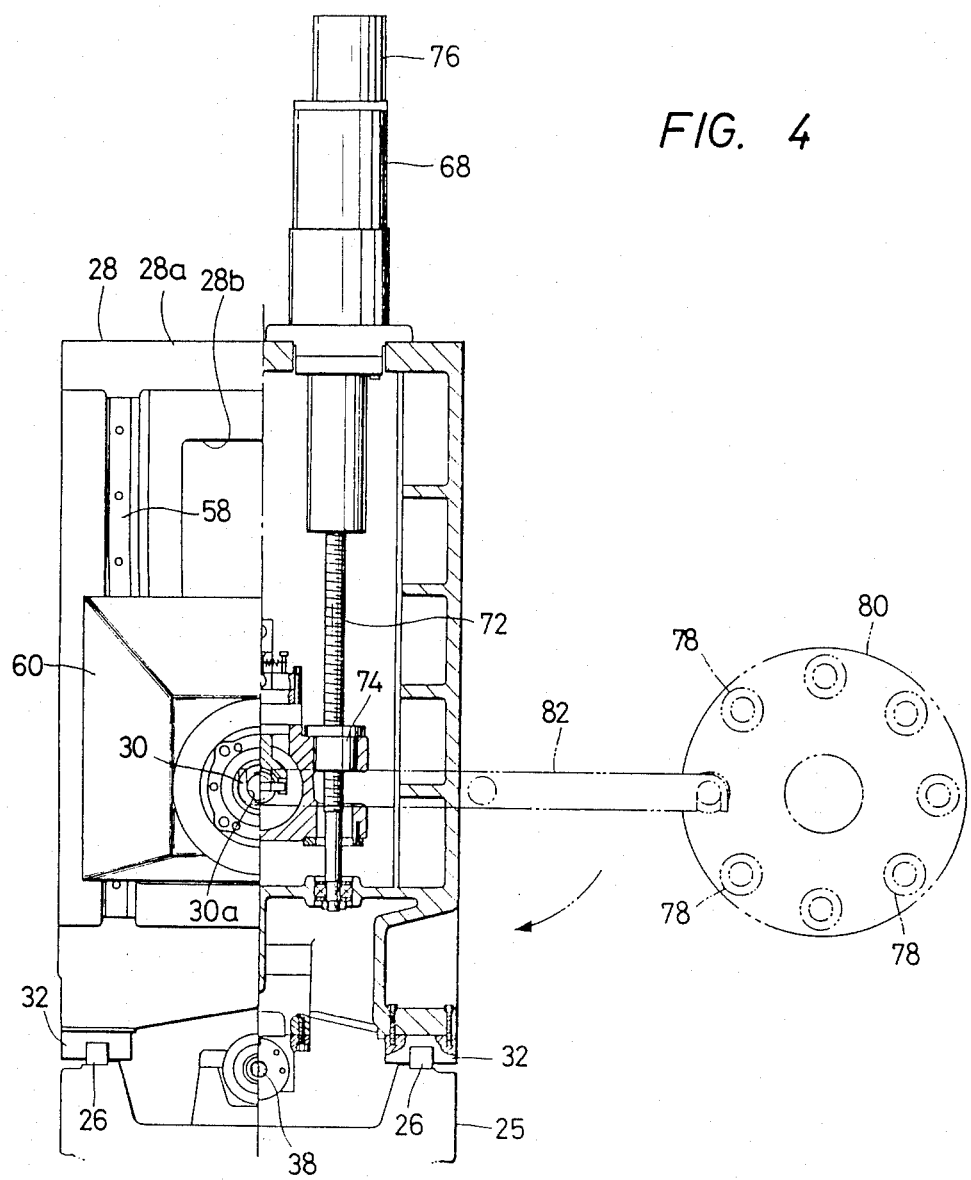
FIG. 4 is a front view partially cut away showing an internal structure of the main spindle head according to the present invention.

The main spindle stand 60 rotatably supports the main spindle 30 which has one end portion provided with a tool mount portion 30a, and the other end portion connected to a motor 66 through a coupling 64 as shown in FIG. 3. With the structure, the main spindle 30 is rotatable about its axis by energizing the motor 66. Further, as shown in FIGS. 3 and 4, an AC servo motor 68 is fixed to a top portion of the main spindle head 28. The motor 68 is connected, through a coupling 70, to a ball screw 72 which extends in the Y-direction and which is engaged with a nut 74 connected to the main spindle 30. Therefore, the main spindle stand 60 is movable relative to the main spindle head 28 in the Y-direction by a predetermined stroke because of the engagement between the nut 74 and the ball screw 72 rotated by the motor 68.

As shown in FIG. 3, the ball screw 72 is provided with a brake means, preferrably an electromagnetic brake 75. The brake means 75 prevents the main spindle stand 60 from displacing downwardly relative to the main spindle head 28 due to its weight when the AC servo motor 68 is deenergized. The AC servo motor 68 is provided with a resolver 76 for detecting angular rotation of a shaft of the motor 68.

Furthermore, as shown in FIG. 4, known automatic tool changer (ATC) is disposed adjacent the base 25. The ATC includes a tool magazine 80 adapted to rotationally index one of a plurality of tools 78 and a rotary arm 82 disposed rotatable about its longitudinal center and positioned between the main spindle head 28 and the tool magazine 80. As shown in FIG. 3, known tool detachable mount mechanism is connected to the main spindle 30. This mechanism includes a draw bar 84 inserted in a hollow portion of the main spindle 30, a crank arm 86 connected to the draw bar 84 at its one end, and a pneumatic cylinder 88 for urging the other end portion of the crank arm 86. In changing the tools, the main spindle head 28 mounting the main spindle stand 60 is shifted to the tool changing region, so that automatic tool changing operation is performed by predtermined timing operations of the tool detachable mount mechanism and the automatic tool changing means(ATC).

Next, operation mode according to the present invention will be described. As shown in FIGS. 1 and 2, the main spindle head 28 and the indexing table 48 are inclined by a predetermined angle with respect to a horizontal plane. Therefore, the workpiece 22 can be easily mounted on the table 48 through the jig 20. Even if a heavy workpiece is deemed to be mounted, the operator can provisionally holds and mounts the heavy workpiece on the slanting table 48. Therefore, operator's labour can be greatly reduced.

Thereafter, the motor 52 is energized for moving the indexing table 48 in X-direction. Further, the table 48 is rotated about its axis C for rotationally indexing one of the faces to be machined in the workpiece 22. Then the machine tool is in machining operation. That is, the motor 34 is energized for moving the main spindle head 28 in Z-direction, and the motor 68 is energized to move the main spindle stand 60 in Y-direction. Further, the indexing table 48 is also moved in X-direction if desired. These operations are made in accordance with a preset operation programs.

Further, the motor 66 is energized to drive the tool mounted at the tip end portion of the main spindle 30, to thereby perform machining to the workpiece 22. During machining, cutting or lubricating oil is supplied so as to cool the workpiece 22 and the tool as well as to smoothly remove the cutting chips. In this case, the main spindle 30 is oriented downwardly in slant manner, so that the cutting oil is smoothly supplied to the entire periphery of the tip end portion of the tool 78.

Further, since the indexing table 48 and the main spindle head 28 are slantingly arranged, the operator can observe the machined face of the workpiece 22 at his frontward position relative to the machine tool. In other words, it is unnecessary for the operator to walk around the machine tool to observe the machined face.

When the tool 78 is required to be changed, the motors 34 and 68 are energized so as to shift the main spindle head 28 and the main spindle stand 60 to predetermined tool changing region, where tool detaching and attaching operations are performed by the rotary arm 82 and the tool magazine 80.

In the above described operations, the main spindle head 28 and the main spindle stand 60 are not displaced downwardly due to their weights, since the electromagnetic brakes 44 and 75 prevents these from being displaced upon deenergization of the motors 34 and 68.

In the above-described embodiment, the indexing table 48 is movable in one direction (X-direction), and the main spindle 30 is displaceable in two directions (Y-,Z-directions) with respect to the table 48. However, the indexing table 48 can be displaceable in two directions (X-,Y-directions), and the main spindle 30 can be displaceable in one direction (Z-direction). Further, in the above embodiment, the automatic tool changing means is disposed adjacent to the base 25, and the tool 78 is changed by the rotary arm 82. However, the automatic tool changing means can be slidably mounted on the main spindle head 28, and the tool can be changed in accordance with the movement of the main spindle head 28 and the main spindle stand 60.

In view of the foregoing, according to the machine tool of this invention, machined portion of the workpiece is easily visible from the front side of the machine tool, since the indexing table and the main spindle head are slantingly arranged. Therefore, it is unnecessary to provide surplus space around the machine tool for the visual observation. Further, workability of the mounting of the workpiece to the indexing table is improved, which work requires hard labor in the conventional vertical axis type machine tool. Furthermore, in the machine tool of this invention, cutting oil can be supplied to the entire periphery of the tip end portion of the tool, which is in high contrast to the conventional horizontal axis type machine tool.

Figure 5:
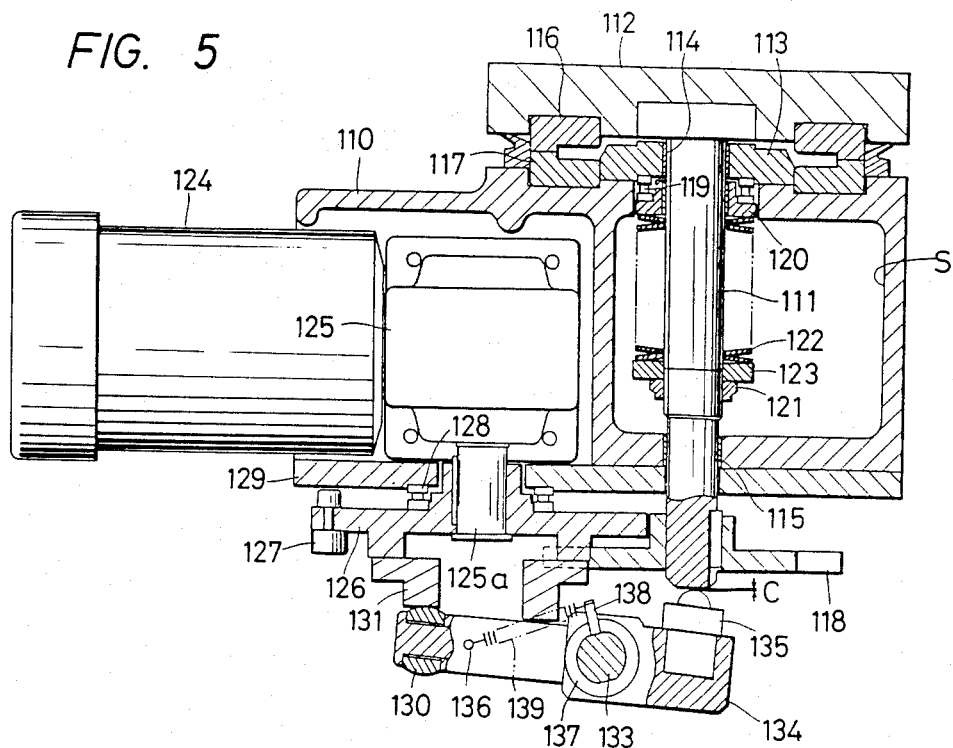
FIG. 5 is a cross-sectional view showing an indexing apparatus according to the present invention.
Figure 6:
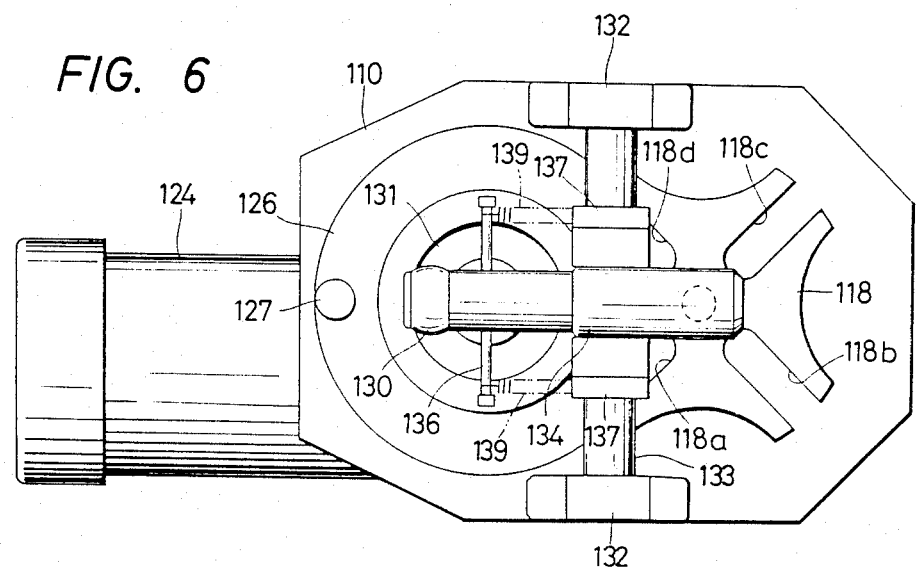
FIG. 6 is a bottom view of the indexing apparatus shown in FIG. 5.

Next, an indexing apparatus according to the present invention will be described with reference to FIGS. 5 through 11(b). In FIGS. 5 and 6, an indexing shaft 111 is supported by a frame 110 which is a base of the indexing apparatus. The indexing shaft 111 is rotatable about its axis and is vertically movable by a predetermined vertical stroke. A circular table 112 is fixed to an upper planar end of the indexing shaft 111. The frame 110 is fixed with a lid member 113, and a sleeve 114 is provided at the lid member 113. Further, another sleeve 115 is provided at a lower portion of the frame 110. The indexing shaft 111 is rotatable and vertically movable relative to these sleeves 114 115. Weights of the indexing shaft 111 and the table 112 are supported by abutting engagement between an upper ring coupling 116 disposed at the lower face of the table 112 and an lower ring coupling 117 disposed at the upper face of the base frame 110. A lower end portion of the indexing shaft 111 extends through the lower portion of the frame 110 and projects therefrom. The projected end portion of the shaft 111 is provided with a follower wheel 118 which is a part of a geneva mechanism described later.

Within an internal space S of the frame 110, the indexing shaft 111 extends. A slide ring 120 is slidably disposed over the upper portion of the shaft 111. The slide ring 120 is rotatable about its axis and is in abutment with the lid member 113 through a thrust bearing 119. The thrust bearing 119 is adapted to support thrusting load applied to the slide bearing 120 urged by a belleville spring 122 toward the lid member 113. A receptacle ring 121 is fixedly secured to the outer peripheral surface of the shaft 111 at its lower end portion, and a rotary ring 123 is in close contact with the receptacle ring 121. The belleville spring 122 is disposed over the shaft 111 and is compressingly interposed between the slide ring 120 and the rotary ring 123, so that the indexing shaft 111 is normally urged downwardly. Therefore, the upper coupling 116 is normally in coupling engagement with the lower coupling 117, to thereby prevent the indexing table 112 from its rotation about its central axis, i.e., the table 112 is locked.

A motor 124 is disposed on the base frame 110. The motor 124 is a single driving force. Rotation of the motor 124 is decelerated by a deceleration means 125, and the decelerated rotation is transmitted to an output shaft 125a extending downwardly from the deceleration means 125. The output shaft 125a is provided with a driving disc 126 which is a drive side of a known geneva mechanism. A follower roller 127 is rotatably supported to the driving disc 126, and the roller 127 is capable of advancing into and retracting from one of elongated grooves 118a–118d formed of the follower wheel 118. The disc 126 and the roller 127 constitute drive means for driving the follower wheel 118. With the structure, continuous rotation of the driving wheel 126 is converted into intermittent rotation of the follower wheel 118, to thus perform rotational indexing of the indexing table 112. The driving disc 126 is also provided with a thrust bearing 128 in abutment with a lower base 129. The thrust bearing 128 undergoes thrusting load applied to the driving disc 126 through a roller 130 and a flat plate cam 131 those being mentioned later.

As shown in FIGS. 5 and 6, at a lower face of the driving wheel 126, a plate cam 131 is provided. The plate cam 131 is arranged coaxial with the wheel 126 and has a small axial length. The lower face of the cam 131 is formed with a cam face 131a as shown in FIG. 8(b). The roller 130 is normally urged toward the cam face 131a. That is, as shown in FIG. 6, a pair of bearings 132 132 are disposed below the base frame 110, and a support shaft 133 is rotatably supported by the bearings 132. A seesaw arm 134 is provided integral with a longitudinally center portion of the support shaft 133 and extends perpendicular thereto. The seesaw arm 134 has one end rotatably provided with the roller 130, and the other end formed with a bush 135 projecting therefrom. The roller 130 is positioned below the cam 131, and confronts the rotational locus of the cam face 131a. The bush 135 is positioned below the lower planar end of the indexing shaft 111.

Figure 7:
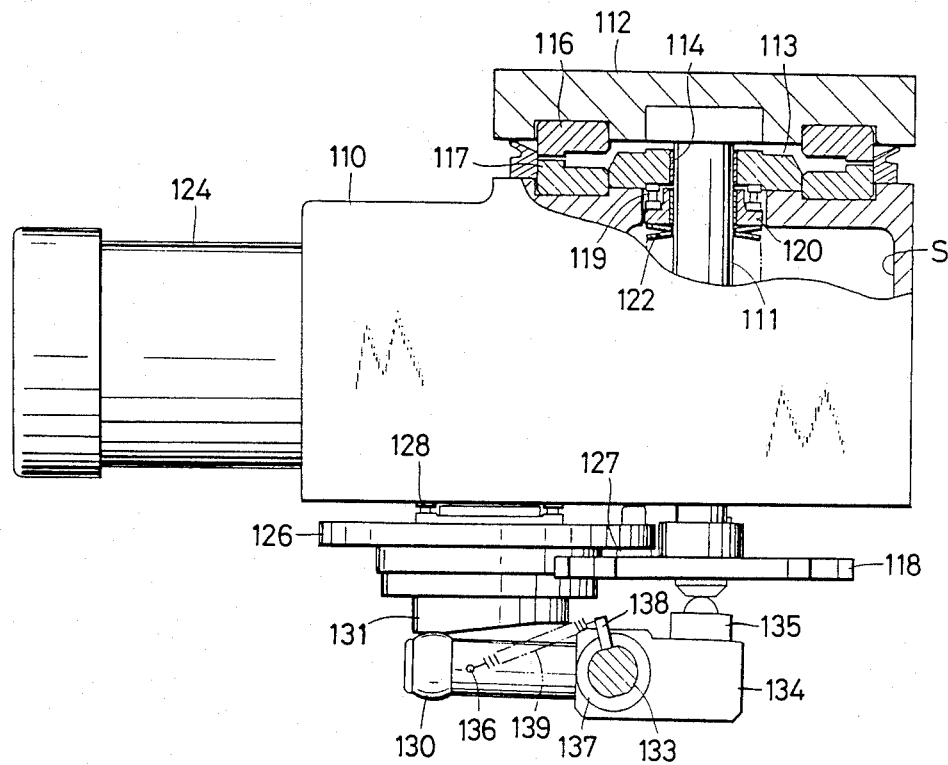
FIG. 7 is a side view partly in cross-section showing a maximum upward position of an indexing table by unclamping the table.
Figure 12:
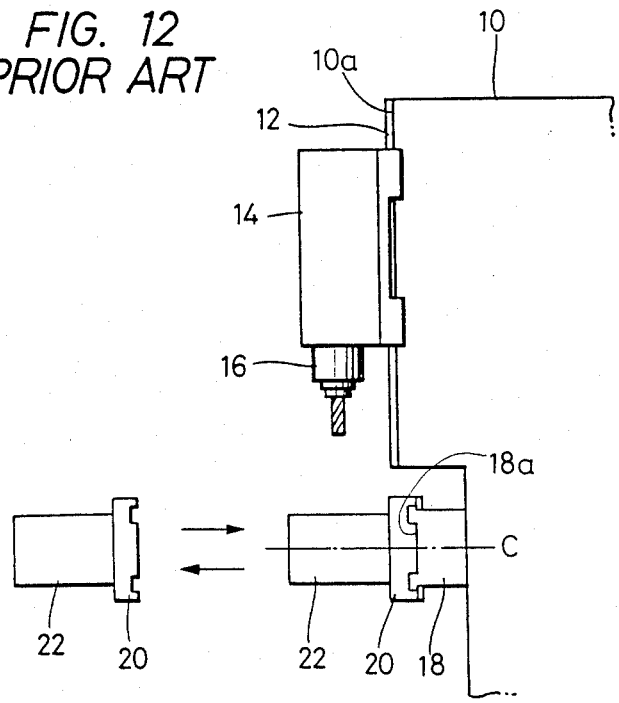
FIG. 12 is a schematic illustration showing a conventional vertical axis type machine tool.
Figure 13:
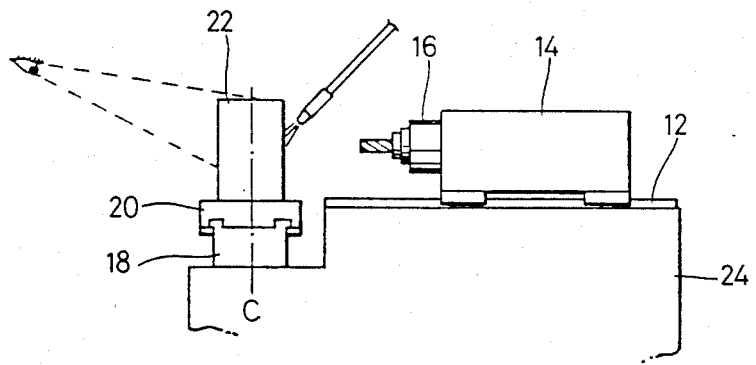
FIG. 13 is a schematic illustration showing a conventional horizontal axis type machine tool; and, FIG. 14 is a cross-sectional view showing a conventional indexing apparatus.
Figure 14:
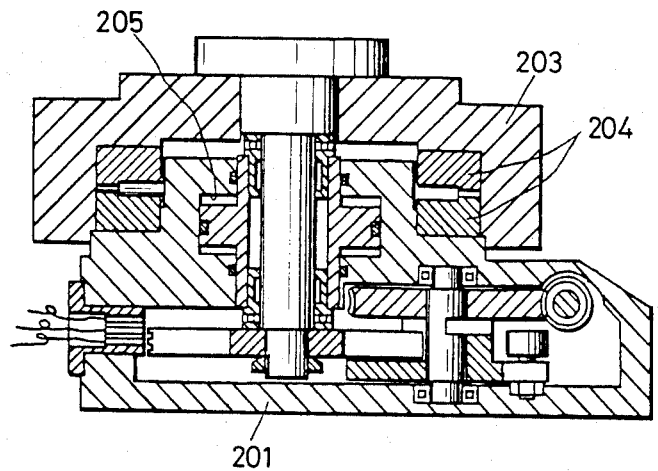

In the seesaw arm 134, a latching rod 136 is inserted through and fixed to the arm 134. The rod 136 extends in a direction perpendicular to the arm 134, and is positioned between a rotational axis of the support shaft 133 and the roller 130. Further, a pair of collars 137 are provided over the shaft 133 for interposing the seesaw arm 134. Pins 138 138 extends from the collars 137. A pair of tension springs 139 139 are provided each between the latching rod 136 and the pin 138 as shown in FIGS. 6 and 7. Because of the biasing force of the springs 139, the seesaw arm 134 is urged in clockwise direction with respect to the support shaft 133, so that the roller 130 is urged upwardly to be in abutment with the cam face 131a of the flat plate cam 131. The cam 131 is rotatable together with the rotation of the driving disc 126, and the roller 130 is vertically movable in response to cam shape of the cam face 131a. Incidentally, at index standby condition shown FIGS. 8(a) and 8(b), a minor clerance c is provided between the bushing 135 and the lower end of the indexing shaft 111.

In the follower wheel 118 according to the present invention, four grooves 118a–118d are formed at equidistance from one another as shown in FIG. 6. When the driving disc 126 is rotated and the follower roller 127 is entered into or retracted from the one of the grooves, the table 112 is subjected to 90 degrees angular rotation for rotational indexing.

When schematically illustrating the plate cam 131 (the cylindrical cam is unrolled to illustrate flat shape) shown in FIG. 8(b), the cam 131 has uphill slope from point (a) to (b) by the angular rotational range of 120 degrees. From the point (b) to point (c), a horizontal cam surface is provided connected to the uppermost end of the uphill slope by the angular rotation of 90 degrees. From the point (c) to point (d), downhill slope is provided by the angular rotation of 120 degrees, and from the point (d) to point (a) lowermost horizontal cam face is provided connected to the lowermost end (d) by the angular rotation of 30 degrees. The 30 degrees of rotation is parted into two angles (15 degrees and remaining 15 degrees) for initial centering. In this explanation, the term "uppermost" and "lowermost" merely concern with reference to FIG. 8(b). In FIGS. 5 and 7, the "uppermost" and "lowermost" should be "lowermost" and "uppermost", respectively when viewing the actual apparatus.

Operation of the indexing apparatus according to the present invention will be described with reference to FIGS. 8(a) to 11(b). In the standby state of the apparatus prior to indexing operation, the roller 130 supported to one end of the seesaw arm 134 is in camming contact with the lowermost area between points (d) and (a)(vertically the highest portion in FIG. 5) of the flat plate cam 131. In this case, the bush 135 is slightly spaced away from the lower planar end of the indexing shaft 111 as shown in FIG. 5. Therefore, the indexing shaft 111 is subjected to resilient force of the belleville spring 122, so that the shaft 111 is urged downwardly, to thereby provide coupling engagement between the upper and lower couplings 116 and 117. Therefore, the indexing table 112 is stably locked with the base frame 110. This coupling engagement is maintained during machining of the workpiece (not shown) during which the indexing table 112 is stably fixed to the base frame 110, and therefore, precise machining is attainable regardless of application of heavy external load to the indexing table.

Turning next to the rotational indexing of the indexing table 112, the motor 124 is energized to initiate rotation of the driving disc 126. The disc 126 is rotated in counterclockwise direction in FIG. 9(a), so that the flat plate cam 131 is rotationally moved relative to the roller 130. As a result, the roller 130 is in contact with the uphill zone (from point a to b) in FIG. 9(b). The uphill zone is in fact gradually downward orientation of the cam face 131a. Accordingly, the seesaw arm 134 is pivotted about the shaft 133 in counterclockwise direction in FIG. 5 against the biasing force of the springs 139. By the pivotal movement, the bush 135 is brought into contact with the lower end face of the indexing shaft 111, and the indexing shaft 111 is gradually moved upwardly against the biasing force of the belleville spring 122, to thereby provide ascent of the table 112, to thus disengage the upper coupling 116 from the lower coupling 117. As a result, the locking of the table 112 is released. In this case, as shown in FIG. 9(a), the follower roller 127 has not yet been advanced into the groove 118a of the follower wheel 118.

When the flat plate cam 131 is further rotated together with the driving disc 126, the cam face zone b-c is brought into contact with the roller 130. Therefore, the roller 130 is at the highest position in FIG. 10(b), (actually, is at the lowest vertical level in the apparatus). In this state, the table 112 is at the highest vertical level while the follower 127 is advanced into the groove 118a of the follower wheel 118 as shown in FIG. 10(a). Therefore, the table unlocking state is maintained, and simultaneously, the rotational indexing of the table 112 is performed by the 90 degrees angular rotation of the follower wheel 118 because of the engagement of the roller 127 with the groove 118a.

The flat plate cam 131 is further rotated together with the driving wheel 126, and the cam face zone c-d is brought into contact with the roller 130 as shown in FIG. 11(b), in which the roller 130 is in contact with the downhill slope of the cam face 131a.(actually, the roller 130 is in contact with upwardly orienting cam face 131a in the actual apparatus). Therefore, the seesaw arm 134 pivots about the shaft 133 in clockwise direction in FIG. 5, so that the indexing shaft 111 maintained at the highest position is gradually displaced downwardly by the biasing force of the belleville spring 122. In this case, the upper coupling 116 fixed to the indexing table 112 is brought into coupling engagement with the lower coupling 117 to provide locking engagement of the table 112. Thereafter, the cam 131 restores its original angular position shown in FIGS. 8(a) and 8(b) whereby successive indexing operation is terminated.

As described above, according to the indexing apparatus of the present invention, the single driving source can provide locking and unlocking of the table which mounts thereon the workpiece as well as rotational indexing thereof. Therefore, compact apparatus result at low cost, and indexing position is promptly obtained because of continuous sequential operation by the single driving source.

While the invention has been described with reference to specific embodiments thereof, it will be apparent to one skilled in the art that various changes and modifications can be made therein without departing from the spirit and scope of the invention.

We claim:

1. An indexing apparatus comprising: a base frame;
   an indexing table for mounting thereon a workpiece, said indexing table being positioned above said base frame;
   an indexing shaft disposed to said indexing table and having one end fixed to said indexing table, said indexing shaft having an axis, an axial end face, and being rotatable about said axis and movable in the direction of said axis with respect to said base frame;
   a single drive source;
   a rotatable drive means connected to said single drive source and driven by said single drive source, said single drive source being connected only to drive said drive means;

a follower member connected to said indexing shaft and engageable with said drive means for rotating said indexing shaft about said axis by a predetermined angle to provide angular rotation of said indexing table;

coupling means disposed between said indexing table and said base frame; and shifting means operably provided for moving said indexing shaft in the direction of said axis in response to said drive means, said axial movement of said indexing shaft providing engagement with and disengagement from said coupling means, said shifting means including a rotatable cam member fixed to said drive means and being rotatable therewith and an arm member having a first end portion provided with an abutting member for abutting an axial end face of said cam member and a second end portion selectively abuttable on said axial end face of said indexing shaft.

2. The indexing apparatus as claimed in claim 1, further comprising a first urging member connected to said arm member for normally urging said abutting member toward said cam face and for urging said other end portion of said arm member away from said other axial end face of said indexing shaft.

3. The indexing apparatus as claimed in claim 2, further comprising a second urging member disposed over said indexing shaft for normally urging said indexing table toward said base frame.

4. The indexing apparatus as claimed in claim 1, wherein said cam member has a first cam face portion for providing coupling engagement between said coupling means, a second cam face portion for gradually disengaging said coupling means from each other, a third cam face portion for maintaining disengaging state of said coupling means, and fourth cam face portion for gradually engaging said coupling means with each other.

5. The indexing apparatus as claimed in claim 4, wherein said drive means comprises a driving disc member connected to said drive source and a roller member rotatably supported to said driving disc member, and wherein said follower member is formed with four grooves spaced away by equi-distance, and selectively engageable with said roller member, said roller member being engageable with one of said grooves when said third cam face portion is in contact with said abutting member, whereby said indexing table is angularly rotated during disengagement of said coupling means from each other.

* * * * *